Sept. 14, 1937.  H. E. HILDEBRAND  2,092,916
PACKAGING BREAD LOAVES AND THE LIKE
Filed Jan. 31, 1935
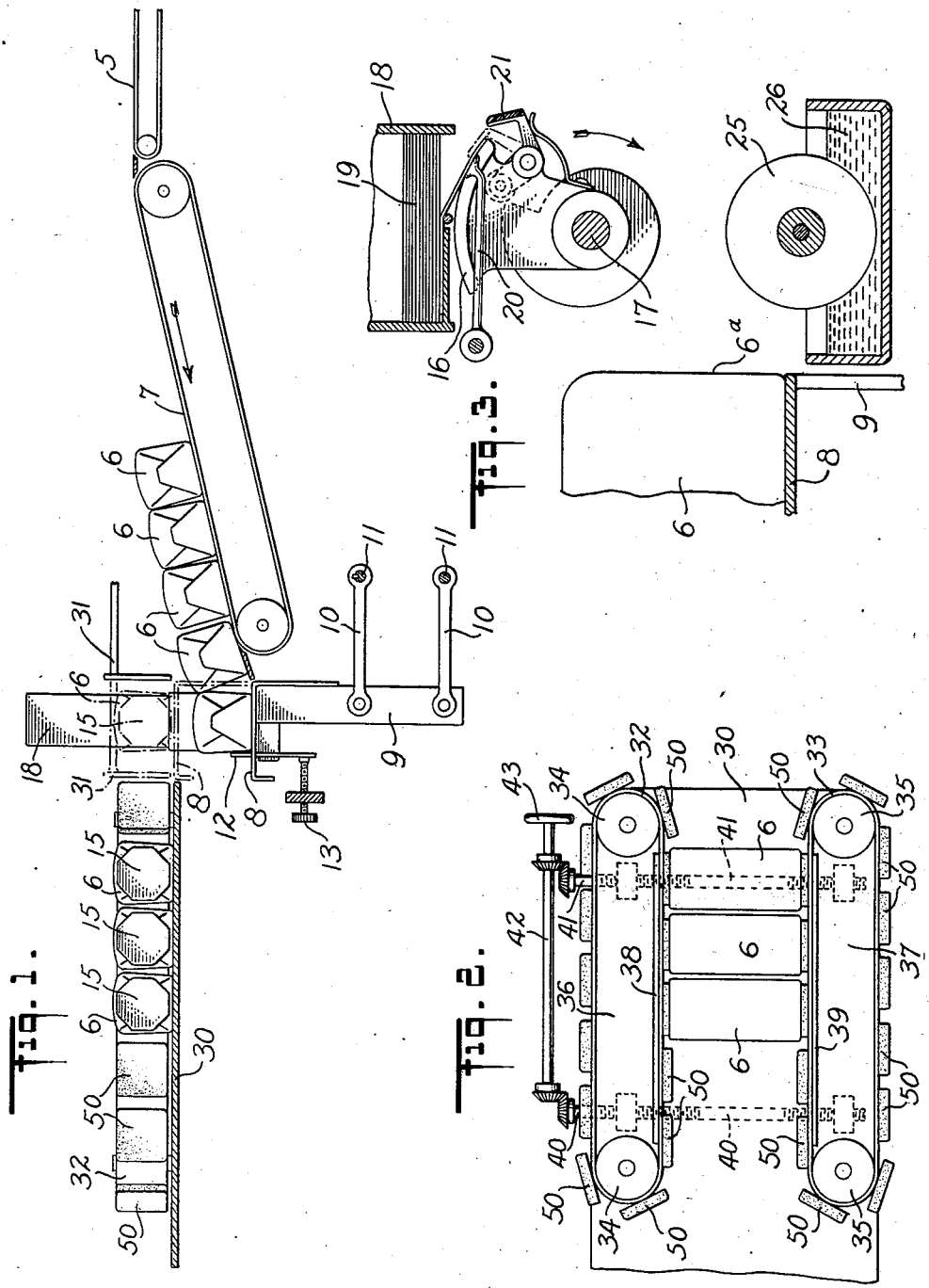
INVENTOR
Henry Edward Hildebrand
BY
ATTORNEY Patented Sept. 14, 1937

2,092,916

UNITED STATES PATENT OFFICE 2,092,916

PACKAGING BREAD LOAVES AND THE LIKE

Henry Edward Hildebrand, Mount Vernon, N. Y., assignor to Continental Baking Company, a corporation of Delaware Application January 31, 1935, Serial No. 4,219

7 Claims. (Cl. 229—87)

This invention relates to the secure and tight wrapping of loaves of bread, in the high speed rythym of a modern bakery; and the invention resides in a method of wrapping bread loaves and the like, and in the completed article of manufacture comprising the loaf and its superior wrapping and sealing features.

In the wrapping of bread loaves, problems of considerable difficulty arise from the fact that the loaves are not of uniform dimensions or conformations, even when they are supposed to be all of the same size and shape. Thus, parts of loaves which, during the baking, are confined within the walls of respective pans of the same size, are of fairly uniform shapes and dimensions when removed from the pans; but the portions of baked loaves which project above the upper edges of the pans vary considerably in size and shape. These facts have to be taken into consideration in designing and operating automatic wrapping apparatus.

According to conventional methods heretofore practiced, bread loaves are fed in succession into wrapping machines in which pieces of paper, that is more or less heavily waxed, are wrapped around the lateral surfaces of the respective loaves, and then the paper projecting beyond the ends of the loaves is folded to cover the loaf ends and to bring the paper folds into overlapping relationship in one way or another. Then the loaves so wrapped are passed sidewise between heated pressure plates which bear against the wrapped loaf ends with considerable pressure, partially melt the wax coating of the paper, and force the overlaps of the paper into close contact with the intention of causing the wax to adhere together and seal the overlaps. In this operation each bread loaf itself functions, in effect, as a part of the mechanism in that opposite ends of the loaf act as opposed pressure plates against which the overlapping waxed wrapper folds must be pressed by the action of the heated pressure plates of the machine. Because of the relatively soft consistency of the bread loaf, and the necessity to preserve it against any material distortion or compacting, definite limitations are imposed upon the degree of pressure permissible to be exerted by the heated pressure plates. Consequently, the latter must be adjusted with care so as to exert the maximum permissible pressure for the purpose of adhering and sealing the waxed wrapper ends, while avoiding the application of enough pressure to do any damage to the loaf. The fact that only a limited pressure can be used against the loaf ends, requires the use of paper which is rather heavily waxed so that an abundance of the wax for adhering and sealing purposes may be present to be softened and made fluent enough to give the best practicable closing and sealing under the conditions of limited low pressure and shortness of the time during which wrapped loaves can be acted upon by the heated pressure plates in the desired high speed rhythm of the wrapping operation. The practical necessity is that the rhythm of wrapping keep step with the entire rhythm of the bakery so that all the equipment may operate at the same high speed, for purposes of mass production.

The described factors of the comparative softness of the bread loaf, the limited pressure permissible for the heated pressure plates, the time element, and the need to use heavily waxed paper,—combine to present problems of operation, expense, and oftentimes of defective product. The adjustment of the heated pressure plates must be carefully regulated. The required quality of waxed paper is expensive. Even so, the sealing at the loaf ends is frequently imperfect because the permissible pressure applied, during the short time available, is not reliably sufficient for perfecting the sealing operation. In modern practice, involving widespread distribution and the necessity to maintain the bread in prime condition during handling and while it remains in the retailer's stock, the perfect sealing at the loaf ends, where the wrapper overlaps in several layers, is an object of the highest importance, to prevent both the drying out of the loaf and its absorption of too much humidity from the air. The importance of these objects is magnified in dealing with loaves which are sliced and then wrapped, according to a practice which has gained great popularity among consumers. The slicing of the loaf greatly multiplies the opportunity for the escape or absorption of moisture, in spite of the fact that the slices are held fairly close together. The crust of the loaf has some insulating effect, so to speak, against the escape or undue absorption of moisture, but that effect is largely lost when the crust is severed by slicing and the cross-sections in the interior of the loaf are relatively exposed. Hence, in wrapping the sliced loaves, it is of materially greater importance to have highly efficient end seals than in wrapping unsliced loaves.

The very fact of slicing, however, reduces in a substantial degree the capacity of the loaf itself to function in opposition to the heated pressure plates by which the sealing of the end folds is supposed to be accomplished. The sliced loaf is conspicuously less stable than the unsliced loaf, is more easily compressible endwise, and the slices are more readily susceptible to distortion. Therefore, the very conditions which call for high sealing pressure to insure perfect seals, prohibit the employment of even as much pressure as is feasible to be used on the unsliced loaves. The practical result has been that the usual inspection of the sliced loaves after wrapping discovers a marked increase in imperfect end seals; and also, even when the wrapped loaves have passed inspection, the percentage of loaves returned by dealers, because their quality has deteriorated, has shown a notable increase.

The irregular conformation of the ends of bread loaves, whether sliced or not, and the lack of uniformity in their conformation, have contributed much to the difficulty of effective end sealing of the wrappers. That area of the loaf end which has been confined against a wall of the pan in baking presents a fairly plain surface, but above the upper extremity of that surface the ends of the loaf bulge in varying degrees, so that the loaf end presents an irregular and variable surface against which the overlapping wrapper folds must be pressed in the sealing operation. Ordinarily, the mechanical pressure plate must be of metal because it must be heated and capable of communicating its heat rapidly to the waxed paper, and it is not practicable to make the surface of the pressure plate conform to the variations in shape of the loaf ends. Usually the heated pressure plates have plain faces for pressing the folded wrapper ends against the irregular shaped surfaces of the loaf ends. This means, obviously, that the end folds of the wrapper can not be pressed uniformly (as they could be between two comparatively rigid plane surfaces), and the result is that the sealing might be perfect at some points but very imperfect at others. This undesirable result is of more frequent occurrence in the presence of the reduced pressure which is preferably employed in wrapping the sliced loaves.

It is a major object of this invention to avoid the difficulties alluded to and to provide for perfectly sealing the ends of wrappers on bread loaves, whether sliced or not, and to accommodate the practice of the invention, with high efficiency, to the high speed rhythm of mass production of wrapped loaves.

The invention may be explained conveniently by reference to the illustrative apparatus diagrammed in the accompanying drawing, in which Figure 1 indicates a side elevation, partly in section, of a delivery belt of a usual type of bread wrapping machine (shown at the right of the figure), and subsequently-acting apparatus for supplementing and perfecting the wrapping operation;

Figure 2 is a detached detail plan of part of the apparatus shown in Figure 1; and Figure 3 is another detached detail, on an enlarged scale, exemplifying mechanism, of conventional type, for delivering and applying labels or the like, which may be employed in the practice of this invention.

In Figure 1 the conveyor belt 5 illustrates the delivery end of a bread wrapping machine from which wrapped loaves 6, 6 have been delivered to a conveyor 7. To suit this invention, the operation of the usual bread wrapping machine may be substantially modified by minimizing the pressure exerted by the heated pressure plates so that it suffices merely to smooth together the folds of the wrapper ends and to cohere only slightly their overlapping portions. This operation, so modified, would not suffice at all for the final sealing of the wrapper. On the contrary, it is not intended to effectuate the sealing, and in fact, it may leave many openings which are not sealed at all, and none which is sealed efficiently. In other words, the efficiency of the conventional wrapping machine, as such, may be deliberately impaired in so far as concerns the end-sealing operation. This invention, therefore, may open the way to either or both of two important results tending to remedy the difficulties above described: first, the degree of pressure exerted by the heated pressure plates may be minimized (to an extent that would be impossible in the normal operation of a wrapping machine) so as practically to eliminate any danger to the loaves, even if they are sliced; and second, the need to use heavily waxed paper may be obviated and instead a lightly waxed or other character of paper, materially less expensive, may be substituted. It is preferred, in one application of the invention, to use a lightly waxed paper, which bears just enough wax to provide for sealing the overlap of the wrapper which occurs at the bottom of the loaf running lengthwise thereof. At that point, where the loaf presents a substantially plane surface, and the wrapper overlaps smoothly and with no angular folds involving several plies of paper (as at the ends), the sealing operation is relatively easy to perform when the paper is only lightly waxed. It has been the difficulty of the end sealing operation which heretofore has required the employment of the heavily waxed paper. Thus, this invention permits not only a radical change from the normal end sealing practice on wrapping machines, but also the use of comparatively inexpensive wrapping material such as would not be compatible with the usual end sealing operations of such machines. The method of end sealing provided by this invention relates primarily to the treatment of the wrapper ends, whatever the wrapping material employed, and is not concerned with the sealing of the wrapper on the bottom or any lateral surface of the loaf, which may be performed in the customary manner or in any other practicable way.

It is to be understood, therefore, that the wrapped loaves 6, 6 on the conveyor 7 have the end folds only preliminarily smoothed sufficiently to hold them in place.

The conveyor 7 is moved intermittently in the direction of the arrow, each step of movement advancing the conveyor through approximately a length equal to the width of a loaf; and each period of rest sufficing for a cycle of operations upon one loaf, as presently described. From the conveyor 7 the wrapped loaves are deposited, one at a time, upon a shelf 8 mounted upon a vertically reciprocable plunger 9 actuated through the parallel-motion links 10. These are rocked upon their pivots 11, 11 to move the plunger 9 and shelf 8 upwardly and then downwardly, through one complete cycle, while the conveyor 7 stands at one of its intervals of rest. When the shelf 8 is in its lowermost position, shown in Figure 1, a stop 12 projects upwardly through an aperture in the floor of the shelf, and serves to position the loaf which rests upon the shelf in the position to which it has been pushed by following loaves on the conveyor 7. The stop 12 is mounted so that it may be adjusted horizontally through a hand wheel 13 for the purpose of positioning loaves of different horizontal dimensions in their proper locations on the shelf 8 with reference to subsequent operations.

During the upward travel of a loaf on the shelf 8, it passes between two sheet-applying mechanisms which apply to opposite ends of the loaf supplementary sheets of paper or the like which cover the overlapped end folds of the wrappers to such an extent that, when the supplementary sheets are finally adhered in place they will effectually cover and seal the interstices in the end folds of the wrapper. These supplementary sheets may be of any size appropriate to the sealing function just described. For instance, they may be of the octagonal shape and size indicated at 15, 15 (Figure 1).

To illustrate the method of applying these supplementary sheets, the drawing indicates diagrammatically (Figure 3) an adaptation of a label-applying mechanism such as may be employed. A wrapped loaf 6 is there shown in side elevation, its end 6a standing in a tangential relation to the line of circular travel of a label-applying sector 16 mounted upon a driven shaft 17. The loaf 6 rests upon the shelf 8, the stop 12 being adjusted to position the loaf ends in proper relation to the line of travel of the sector 16. Above the shaft 17 is a hopper 18 containing a stack 19 of the supplementary sheets. One hopper 18 is shown in Figure 1 at the remote end of the loaf. In practice, another like hopper, with the related applying mechanism, will be located at the near end of the loaf in Figure 1, so that the supplementary sheets will be applied to both ends of the wrapped loaf simultaneously. A hollow rocking suction arm 20, connected to a source of exhaust, pulls off one sheet at a time from the bottom of the stack 19, and the right-hand margin is gripped by a finger 21 mounted on the sector 16, so that the rotation of the sector in the direction of the arrow pulls the sheet out of the hopper and carries it, clockwise, toward an adhesive-applying roller 25. The peripheral surface of the sector 16 is of sufficient area to support the supplementary sheet as it is rolled between the sector and the roller 25. The latter has its lower part in a bath of adhesive 26, which is carried up and applied to the supplementary sheet in the manner well known in the art. The vertical movement of the shelf 8, and the rotary movement of the sector 16, are such that the advance end of a supplementary sheet, after the adhesive has been applied, will stand near the upper extremity of the loaf end, at the proper stage in the vertical movement of the loaf to cause the loaf and sheet to travel upward synchronously to adhere the latter to the former. The relationship between the position of the loaf end 6a and the sector 16, during the sheet-applying operation, is such that only a gentle pressure is applied to the loaf, sufficient to adhere the sheet preliminarily to the end folds of the wrapper.

After the supplementary sheets have been applied to the ends of the wrapper, the shelf 8 presently arrives at the dotted line position shown in Figure 1, in which the shelf registers with a table 30, and the loaf supported on the shelf stands in front of a horizontally moving pusher 31. Promptly upon the arrival of the loaf at that point the pusher 31 is moved toward the left, in Figure 1, to move the loaf off of the shelf 8 and on to the table 30, where it is interposed between traveling belts 32, 33, mounted on drums 34, 34 and 35, 35, having vertical axes.

Each pair of drums for example 34, 34, is mounted upon a plate 36 or 37 from which an upstanding flange 38 or 39 projects in position to support the adjacent runs of the belts that are parallel to engage loaves properly between them. The plates 36 and 37 are mounted in slideways extending across the table 30 (i. e. vertically in Figure 2) so that the belts and the flanges 38, 39 may be adjusted toward and from each other to suit loaves of different lengths; and that adjustment may move the plates 36 and 37 symmetrically toward and from each other, through the illustrated arrangement of reversely threaded shafts 40, 41, engaging threaded lugs depending from the respective plates. Spur gears on the shafts 40 and 41 are engaged with like gears on an adjusting shaft 42 having a hand wheel 43.

The belts 32, 33 are faced with relatively thick pads 50, 50 of soft but resilient material, such as sponge rubber, having sufficient thickness, softness and resilience to enable them to conform approximately to the varying shapes of the loaf ends and the varying lengthwise dimensions of successive loaves for any given series of loaves. The plates 36 and 37 are adjusted to such a distance apart that the pads 50 (backed up by the belts 33 and the flanges 38 and 39) will be caused to press gently but firmly against the supplementary sheets on the loaf ends and perfect their adhesion to the folds of the wrapper so as to complete the wrapping. The lengths of the belts between their respective drums 34, 34 and 35, 35 are such that the sealing pressure of the pads 50, 50 is continued long enough, in respect of each loaf traveling over the table 30, to insure the efficient completion of the sealing operation. It is perhaps accurate to say that the action of the pads 50, 50 on the supplementary sheets is an effective holding of the sheets closely against the wrapper folds, long enough for the adhesive to take a sufficient set, rather than to say that it is a pressing operation. In any event, such pressure as is exerted by the pads 50, 50 for the purpose of adhering the supplementary sheets, is not comparable with the character of pressure usually employed heretofore by the heated pressure plates of a bread wrapping machine in which the pressure must be great enough to communicate a melting heat quickly to and through overlapping layers of the waxed end folds so as to seal them together as well as practicable.

The character of adhesive used in the bath 26 (Figure 3) to be applied to the supplementary sheets, and to adhere them preliminarily and finally to the wrapper ends, should be such that it will not set too quickly, but will set sufficiently to perfect the seal before the loaves have advanced beyond the belts 32, 33. Those belts are power driven, in any appropriate manner, at a speed synchronized with the rhythm of the other mechanism so that the time interval within which the adhesive may take its proper set is readily determinable.

A preferred kind of adhesive well suited to the purpose of this invention is one comprising rubber latex combined, if desired, with casein and perhaps with an alkaline medium, for instance ammonium hydroxide, to aid in maintaining the other ingredients in solution, the mixture being diluted if required. This specific variety of adhesive is not essential to this invention in its broader aspects, but when used the action of the rubber latex enters into the practice of this method very desirably and yields superior results. This is particularly true when the wrapping material or the supplementary sheet or both is or are coated or impregnated with wax or the like to which some kinds of adhesives will not stick adequately.

A method practiced according to this invention lends itself excellently to operation by high speed mechanisms, such that any desired rhythm in bakery operations may be sustained. At the same time, the results of tight and permanent sealing, without the need to apply at any time any considerable pressure upon the loaf ends, are highly meritorious, and the resulting packaged loaf or other similar product is in itself a novel and greatly improved article of manufacture.

As will be evident to those skilled in the art, the substance of this invention may be utilized in various forms and sequences of operation, and in numerous combinations and sub-combinations of features as defined in the subjoined claims.

I claim:

1. A method of packaging bread loaves and the like which is characterized by wrapping lightly waxed paper around the lateral surfaces of a loaf; folding the end margins of the wrapper into overlapping folds to cover the loaf ends, and smoothing them with minimum pressure and heat sufficient to soften the wax and preliminarily to stick the folds in place; applying supplementary sheets, and an adhesive comprising rubber latex, to the overlapping folds at the loaf ends; and applying yielding pressure to said supplementary sheets at the opposite loaf ends until the adhesive has set sufficiently to seal the end folds of the wrapper.

2. A method of packaging bread loaves and like which is characterized by wrapping waxed paper around the lateral surfaces of the loaf; folding the end margins of the wrapper into overlapping folds to cover the loaf ends, and smoothing them with minimum pressure and heat sufficient to soften the wax and stick the flaps preliminarily in place; applying supplementary sheets and an adhesive comprising rubber latex, to the overlapping folds at the loaf ends; and holding the supplementary sheets and the adhesive at the opposite loaf ends yieldingly against said folds until the adhesive has set sufficiently to seal the end folds of the wrapper.

3. A method of packaging bread loaves or the like which is characterized by placing wrapping material around the lateral surfaces of the loaf; folding the end margins of the wrapper into overlapping folds at the loaf ends; applying supplementary sheets and rubber latex to the overlapping folds at the loaf ends; and maintaining the sheets and latex in place until the latex has set sufficiently to unite the sheets and the end folds.

4. As an article of manufacture, a wrapped bread loaf comprising, in combination, a lightly waxed wrapping material around the lateral surfaces of the loaf; overlapping end folds of the wrapper slightly stuck together by the wax sufficiently to hold the flaps in position at the loaf ends; and supplementary sheets substantially covering the end folds of the wrapper, and secured thereto by an adhesive comprising rubber latex, the supplementary sheets and the adhesive forming substantially complete seals closing the interstices of the end folds of the wrapper against escape or admission of moisture.

5. As an article of manufacture, a wrapped bread loaf comprising, in combination, wrapping material around the lateral surfaces of the loaf; overlapping end folds of the wrapper; and supplementary sheets on the end folds of the wrapper, and secured thereto by rubber latex, the supplementary sheets and the latex forming substantially complete seals closing the interstices of the end folds.

6. As an article of manufacture, a wrapped bread loaf comprising, in combination, waxed wrapping material around the lateral surfaces of the loaf; overlapping end folds of the wrapper at the loaf ends; and supplementary sheets on the end folds of the wrapper, and secured thereto by rubber latex, the supplementary sheets and the latex forming seals closing the interstices of the end folds.

7. As an article of manufacture, a wrapped bread loaf comprising, in combination, waxed wrapping material around the lateral surfaces of the loaf and at the loaf ends; and supplementary sheets substantially overlying the loaf ends and covering any interstices in the wrapper, and secured thereto by rubber latex, the supplementary sheets and the latex forming substantially complete seals at the loaf ends.

HENRY EDWARD HILDEBRAND.